US011007042B2

(12) United States Patent
Long et al.

(10) Patent No.: US 11,007,042 B2
(45) Date of Patent: May 18, 2021

(54) SYSTEMS AND METHODS FOR MARKING MODELS FOR DENTAL ALIGNER FABRICATION

(71) Applicant: SDC U.S. SmilePay SPV, Nashville, TN (US)

(72) Inventors: Josh Long, Nashville, TN (US); Christopher Yancey, Nashville, TN (US); Tony Solarek, Nashville, TN (US); Daniel Pfeffer, Nashville, TN (US); Clete Culp, Nashville, TN (US)

(73) Assignee: SDC U.S. SmilePay SPV, Nashville, TN (US)

( * ) Notice: Subject to any disclaimer, the term of this patent is extended or adjusted under 35 U.S.C. 154(b) by 0 days.

(21) Appl. No.: 16/268,633

(22) Filed: Feb. 6, 2019

(65) Prior Publication Data
US 2020/0246119 A1    Aug. 6, 2020

(51) Int. Cl.
 *A61C 13/34* (2006.01)
 *A61C 9/00* (2006.01)
 (Continued)

(52) U.S. Cl.
 CPC ............ *A61C 13/34* (2013.01); *A61C 9/0053* (2013.01); *B29C 64/153* (2017.08);
 (Continued)

(58) Field of Classification Search
 CPC ..... A61C 13/34; A61C 9/0053; B29C 64/153; B29C 64/393; B29C 64/20; B29C 64/165;
 (Continued)

(56) References Cited

U.S. PATENT DOCUMENTS 3,688,963 A   9/1972 Snow et al.
3,828,997 A   8/1974 Snow
(Continued)

FOREIGN PATENT DOCUMENTS

EP    3 091 454 A1    11/2016

OTHER PUBLICATIONS

Narayanan, Sankara, "QR Codes and Security Solutions", International Journal of Computer Science and Telecommunications, vol. 3, Issue 7, Jul. 2012, p. 69-72 (Year: 2012).*
(Continued)

*Primary Examiner* — Galen H Hauth
(74) *Attorney, Agent, or Firm* — Foley & Lardner LLP

(57) ABSTRACT

Described herein are systems and methods for marking models for dental aligner fabrication. A method for producing a physical model of teeth including a three-dimensional marking includes receiving a first digital model of teeth in an alignment position and selecting a location for marking a physical model of the teeth in the alignment position with a three-dimensional marking, the physical model to be fabricated based on the first digital model. The method also includes generating a second digital model of the teeth in the alignment position based on the first digital model, the second digital model representing the physical model and including the three-dimensional marking at the marking location, and using a three-dimensional fabrication method to fabricate the physical model including the three-dimensional marking from the second digital model.

20 Claims, 10 Drawing Sheets

(51) Int. Cl.
*B33Y 10/00* (2015.01)
*B33Y 30/00* (2015.01)
*B33Y 50/02* (2015.01)
*B29C 64/165* (2017.01)
*B29C 64/20* (2017.01)
*B29C 64/393* (2017.01)
*B33Y 80/00* (2015.01)
*B29C 64/153* (2017.01)
*B29L 31/00* (2006.01)

(52) U.S. Cl.
CPC ............ *B29C 64/165* (2017.08); *B29C 64/20* (2017.08); *B29C 64/393* (2017.08); *B33Y 10/00* (2014.12); *B33Y 30/00* (2014.12); *B33Y 50/02* (2014.12); *B33Y 80/00* (2014.12); *B29L 2031/753* (2013.01)

(58) Field of Classification Search
CPC ......... B33Y 80/00; B33Y 50/02; B33Y 10/00; B33Y 30/00; B29L 2031/753
See application file for complete search history.

(56) References Cited

U.S. PATENT DOCUMENTS

| | | |
|---|---|---|
| 4,308,005 A | 12/1981 | Zundel |
| 4,687,612 A | 8/1987 | Clarke et al. |
| 5,620,715 A | 4/1997 | Hart et al. |
| 5,806,745 A | 9/1998 | Irwin |
| 5,975,893 A | 11/1999 | Chishti et al. |
| 6,350,120 B1 | 2/2002 | Sachdeva et al. |
| 6,371,761 B1 | 4/2002 | Cheang et al. |
| 6,398,548 B1 | 6/2002 | Muhammad et al. |
| 6,463,344 B1 | 10/2002 | Pavloskaia et al. |
| 6,633,789 B1 | 10/2003 | Nikolskiy et al. |
| 6,665,570 B2 | 12/2003 | Pavloskaia et al. |
| 6,688,886 B2 | 2/2004 | Hughes et al. |
| 6,705,853 B1 | 3/2004 | Nehring |
| 6,776,614 B2 | 8/2004 | Wiechmann et al. |
| 6,918,761 B2 | 7/2005 | Sachdeva et al. |
| 6,976,627 B1 | 12/2005 | Culp et al. |
| 7,037,111 B2 | 5/2006 | Miller |
| 7,110,594 B2 | 9/2006 | Jones et al. |
| 7,261,533 B2 | 8/2007 | Wrosz et al. |
| 7,273,367 B2 | 9/2007 | Hughes et al. |
| 7,293,988 B2 | 11/2007 | Wen |
| 7,306,152 B2 | 12/2007 | Culp et al. |
| 7,309,230 B2 | 12/2007 | Wen |
| 7,319,529 B2 | 1/2008 | Babayoff |
| 7,333,874 B2 | 2/2008 | Taub et al. |
| 7,335,024 B2 | 2/2008 | Wen |
| 7,357,634 B2 | 4/2008 | Knopp |
| 7,361,018 B2 | 4/2008 | Imgrund et al. |
| 7,383,094 B2 | 6/2008 | Kopelman et al. |
| 7,384,266 B2 | 6/2008 | Wen |
| 7,433,810 B2 | 10/2008 | Pavloskaia et al. |
| 7,442,040 B2 | 10/2008 | Kuo |
| 7,476,100 B2 | 1/2009 | Kuo |
| 7,511,829 B2 | 3/2009 | Babayoff |
| 7,556,496 B2 | 7/2009 | Cinader et al. |
| 7,572,121 B2 | 8/2009 | Wrosz et al. |
| 7,578,673 B2 | 8/2009 | Wen et al. |
| 7,604,181 B2 | 10/2009 | Culp et al. |
| 7,611,058 B2 | 11/2009 | Culp et al. |
| 7,690,917 B2 | 4/2010 | Marshall |
| 7,695,278 B2 | 4/2010 | Sporbert et al. |
| 7,699,606 B2 | 4/2010 | Sachdeva et al. |
| 7,711,447 B2 | 5/2010 | Lu et al. |
| 7,738,989 B2 | 6/2010 | Taub et al. |
| 7,744,369 B2 | 6/2010 | Imgrund et al. |
| 7,831,322 B2 | 11/2010 | Liu et al. |
| 7,837,469 B2 | 11/2010 | Chishti et al. |
| 7,840,373 B2 * | 11/2010 | Culp .................. A61C 7/08 702/155 |
| 7,865,259 B2 | 1/2011 | Kuo et al. |
| 7,905,408 B2 | 3/2011 | Culp et al. |
| 7,950,131 B2 | 5/2011 | Hilliard |
| 7,963,765 B2 | 6/2011 | Bergersen |
| 7,993,134 B2 | 8/2011 | Wen |
| 7,993,136 B2 | 8/2011 | Wen |
| 7,996,099 B2 | 8/2011 | Kopelman et al. |
| 8,019,465 B2 | 9/2011 | Spiridonov et al. |
| 8,029,277 B2 | 10/2011 | Imgrund et al. |
| 8,030,588 B2 | 10/2011 | Culp et al. |
| 8,038,444 B2 | 10/2011 | Kitching et al. |
| 8,047,846 B2 | 11/2011 | Wen |
| 8,060,236 B2 | 11/2011 | Hilliard |
| 8,075,306 B2 | 12/2011 | Kitching et al. |
| 8,083,976 B2 | 12/2011 | Lengsfeld et al. |
| 8,105,080 B2 | 1/2012 | Chishti et al. |
| 8,133,050 B2 | 3/2012 | Bergersen |
| 8,145,340 B2 | 3/2012 | Taub et al. |
| 8,155,780 B2 | 4/2012 | Lu et al. |
| 8,177,551 B2 | 5/2012 | Sachdeva et al. |
| 8,192,197 B2 | 6/2012 | Sporbert et al. |
| 8,199,988 B2 | 6/2012 | Marshall et al. |
| 8,244,390 B2 | 8/2012 | Kuo et al. |
| 8,296,952 B2 | 10/2012 | Greenberg |
| 8,301,287 B2 | 10/2012 | Kopelman et al. |
| 8,352,060 B2 | 1/2013 | Chun et al. |
| 8,383,977 B2 | 2/2013 | Culp et al. |
| 8,439,672 B2 | 5/2013 | Matov et al. |
| 8,451,456 B2 | 5/2013 | Babayoff |
| 8,469,706 B2 | 6/2013 | Kuo |
| 8,478,435 B2 | 7/2013 | Kuo et al. |
| 8,502,107 B2 | 8/2013 | Uckelmann |
| 8,562,338 B2 | 10/2013 | Kitching et al. |
| 8,562,340 B2 | 10/2013 | Chishti et al. |
| 8,587,582 B2 | 11/2013 | Matov et al. |
| 8,591,225 B2 | 11/2013 | Wu et al. |
| 8,636,510 B2 | 1/2014 | Kitching et al. |
| 8,684,729 B2 | 4/2014 | Wen |
| 8,738,165 B2 | 5/2014 | Cinader et al. |
| 8,740,614 B2 | 6/2014 | Wen et al. |
| 8,807,999 B2 | 8/2014 | Kuo et al. |
| 8,828,287 B2 | 9/2014 | Van Der Zel |
| 8,885,175 B2 | 11/2014 | Babayoff |
| 8,888,480 B2 | 11/2014 | Yoo et al. |
| 8,899,978 B2 | 12/2014 | Kitching et al. |
| 8,930,219 B2 | 1/2015 | Trosien et al. |
| 8,932,058 B2 | 1/2015 | Fisker et al. |
| 8,936,463 B2 | 1/2015 | Mason et al. |
| 9,011,149 B2 | 4/2015 | Wen |
| 9,017,072 B2 | 4/2015 | Kitching et al. |
| 9,069,914 B2 | 6/2015 | Kopelman et al. |
| 9,101,433 B2 | 8/2015 | Babayoff |
| 9,107,722 B2 | 8/2015 | Matov et al. |
| 9,108,338 B2 | 8/2015 | Sirovskiy et al. |
| 9,152,145 B2 | 10/2015 | Culp et al. |
| 9,161,823 B2 | 10/2015 | Morton et al. |
| 9,168,113 B2 | 10/2015 | Wu et al. |
| 9,183,764 B2 | 11/2015 | Sugimoto et al. |
| 9,192,305 B2 | 11/2015 | Levin |
| 9,241,774 B2 | 1/2016 | Li et al. |
| 9,326,830 B2 | 5/2016 | Kitching et al. |
| 9,330,205 B2 | 5/2016 | Lawitschka et al. |
| 9,333,052 B2 | 5/2016 | Miller |
| 9,364,297 B2 | 6/2016 | Kitching et al. |
| 9,393,083 B2 | 7/2016 | Bergersen |
| 9,403,238 B2 | 8/2016 | Culp |
| 9,404,740 B2 | 8/2016 | Babayoff |
| 9,414,897 B2 | 8/2016 | Wu et al. |
| 9,433,477 B2 | 9/2016 | Borovinskih et al. |
| 9,433,479 B2 | 9/2016 | Phan et al. |
| 9,498,301 B2 | 11/2016 | Kim |
| 9,536,020 B2 | 1/2017 | Wen |
| 9,539,071 B2 | 1/2017 | Taub et al. |
| 9,566,132 B2 | 2/2017 | Stone-Collonge et al. |
| 9,572,637 B2 | 2/2017 | Jinkyun |
| 9,579,171 B2 | 2/2017 | Lorunser et al. |
| 9,597,164 B2 | 3/2017 | Li et al. |
| 9,610,140 B2 | 4/2017 | Anderson et al. |
| 9,622,834 B2 | 4/2017 | Chapoulaud et al. |

(56) References Cited

U.S. PATENT DOCUMENTS

| | | |
|---|---|---|
| 9,675,432 B2 | 6/2017 | Lee et al. |
| 9,717,568 B1 | 8/2017 | Adell |
| 9,717,573 B2 | 8/2017 | Vuillemot |
| 9,744,002 B2 | 8/2017 | Moss et al. |
| 9,763,750 B2 | 9/2017 | Kim et al. |
| 9,801,698 B2 | 10/2017 | Levin |
| 9,844,420 B2 | 12/2017 | Cheang |
| 9,844,429 B2 | 12/2017 | Kopelman et al. |
| 9,848,958 B2 | 12/2017 | Matov et al. |
| 9,861,452 B2 | 1/2018 | Rundlett |
| 9,861,457 B2 | 1/2018 | Fisker et al. |
| 9,888,982 B2 | 2/2018 | Lee |
| 9,922,170 B2 | 3/2018 | Trosien et al. |
| 9,937,023 B2 | 4/2018 | Andersson et al. |
| 9,939,258 B2 | 4/2018 | Lampert et al. |
| 9,943,382 B2 | 4/2018 | Wen |
| 9,956,058 B2 | 5/2018 | Kopelman |
| 9,962,238 B2 | 5/2018 | Boltunov et al. |
| 10,001,771 B2 | 6/2018 | Matty |
| 10,011,050 B2 * | 7/2018 | Kitching .............. A61C 7/002 |
| 10,052,174 B2 | 8/2018 | Kitching et al. |
| 10,099,256 B2 | 10/2018 | Culp et al. |
| 10,109,114 B1 | 10/2018 | Yancey et al. |
| 10,111,730 B2 | 10/2018 | Webber et al. |
| 10,136,965 B2 | 11/2018 | Wiechmann et al. |
| 10,179,035 B2 | 1/2019 | Shivapuja et al. |
| 10,195,690 B2 | 2/2019 | Culp |
| 10,231,800 B2 | 3/2019 | Wiechmann |
| 10,238,472 B2 | 3/2019 | Levin |
| 10,241,499 B1 | 3/2019 | Griffin |
| 10,255,407 B2 | 4/2019 | Borovinskih et al. |
| 10,258,431 B2 | 4/2019 | Hong |
| 10,258,439 B1 | 4/2019 | Kitching et al. |
| 10,265,150 B2 | 4/2019 | Hultgren et al. |
| 10,271,923 B2 | 4/2019 | Kuo et al. |
| 10,278,794 B1 | 5/2019 | Raslambekov |
| 10,315,353 B1 | 6/2019 | Culp et al. |
| 2003/0152884 A1 | 8/2003 | Wiechmann et al. |
| 2004/0166456 A1 | 8/2004 | Chishti et al. |
| 2004/0243361 A1 | 12/2004 | Steuben et al. |
| 2005/0082703 A1 | 4/2005 | Wrosz |
| 2006/0008760 A1 | 1/2006 | Phan et al. |
| 2006/0072810 A1 | 4/2006 | Scharlack et al. |
| 2008/0014534 A1 | 1/2008 | Barwicz et al. |
| 2008/0141534 A1 | 6/2008 | Hilliard |
| 2008/0187887 A1 | 8/2008 | Lu et al. |
| 2008/0300824 A1 | 12/2008 | Culp et al. |
| 2009/0061382 A1 | 3/2009 | Wen |
| 2010/0006640 A1 | 1/2010 | Culp et al. |
| 2011/0003025 A1 | 1/2011 | Patel |
| 2012/0261847 A1 | 10/2012 | Sirovskiy et al. |
| 2013/0073071 A1 | 3/2013 | Culp |
| 2013/0161241 A1 | 6/2013 | Culp et al. |
| 2014/0315153 A1 | 10/2014 | Kitching et al. |
| 2015/0013688 A1 | 1/2015 | Frantz et al. |
| 2015/0250568 A1 | 9/2015 | Fisker et al. |
| 2015/0289960 A1 | 10/2015 | Shigemoto et al. |
| 2015/0313687 A1 | 11/2015 | Blees et al. |
| 2015/0314520 A1 | 11/2015 | Sirovskiy et al. |
| 2016/0023249 A1 | 1/2016 | Culp et al. |
| 2016/0106572 A1 | 4/2016 | Frantz et al. |
| 2016/0121540 A1 | 5/2016 | Deneire |
| 2016/0206403 A1 | 7/2016 | Ouellette et al. |
| 2016/0242870 A1 | 8/2016 | Matov et al. |
| 2016/0310236 A1 | 10/2016 | Kopelman et al. |
| 2016/0332255 A1 | 11/2016 | Culp |
| 2016/0332367 A1 | 11/2016 | Sun et al. |
| 2017/0007359 A1 | 1/2017 | Kopelman et al. |
| 2017/0065373 A1 | 3/2017 | Martz et al. |
| 2017/0100207 A1 | 4/2017 | Wen |
| 2017/0112594 A1 | 4/2017 | Hilliard |
| 2017/0144360 A1 | 5/2017 | Moore et al. |
| 2017/0231721 A1 | 8/2017 | Akeel et al. |
| 2017/0281314 A1 | 10/2017 | Freimuller |
| 2017/0360535 A1 | 12/2017 | Rynerson et al. |
| 2017/0367792 A1 | 12/2017 | Raby et al. |
| 2018/0000564 A1 | 1/2018 | Cam et al. |
| 2018/0021106 A1 | 1/2018 | Khan |
| 2018/0036623 A1 | 2/2018 | Kuo |
| 2018/0055600 A1 | 3/2018 | Matov et al. |
| 2018/0071054 A1 | 3/2018 | Ha |
| 2018/0071062 A1 | 3/2018 | Kirchner et al. |
| 2018/0092713 A1 | 4/2018 | Boehlau et al. |
| 2018/0098828 A1 | 4/2018 | Hansen et al. |
| 2018/0116762 A1 * | 5/2018 | Kopelman .............. A61C 7/002 |
| 2018/0117845 A1 | 5/2018 | Buller et al. |
| 2018/0153651 A1 | 6/2018 | Tong et al. |
| 2018/0185118 A1 | 7/2018 | Sutter et al. |
| 2018/0235730 A1 | 8/2018 | Djamchidi |
| 2018/0243978 A1 | 8/2018 | Nguyen et al. |
| 2018/0263730 A1 | 9/2018 | Sirovskiy et al. |
| 2018/0271620 A1 | 9/2018 | Rodriguez et al. |
| 2018/0303581 A1 | 10/2018 | Martz et al. |
| 2018/0303582 A1 | 10/2018 | Hung |
| 2018/0318044 A1 | 11/2018 | Tal |
| 2018/0333224 A1 | 11/2018 | Van Esbroeck et al. |
| 2018/0333226 A1 | 11/2018 | Tsai et al. |
| 2018/0333231 A1 | 11/2018 | Somasundaram et al. |
| 2019/0019187 A1 | 1/2019 | Miller et al. |
| 2019/0029522 A1 | 1/2019 | Sato et al. |
| 2019/0029775 A1 | 1/2019 | Morton et al. |
| 2019/0039100 A1 | 2/2019 | Culp et al. |
| 2019/0053876 A1 | 2/2019 | Sterental et al. |
| 2019/0053883 A1 | 2/2019 | Sun et al. |
| 2019/0083208 A1 | 3/2019 | Hansen et al. |
| 2019/0090984 A1 | 3/2019 | Martz et al. |
| 2019/0125503 A1 | 5/2019 | Krolikowski et al. |
| 2019/0133716 A1 | 5/2019 | Kim et al. |
| 2019/0160590 A1 | 5/2019 | Culp |
| 2019/0164352 A1 | 5/2019 | Yancey et al. |
| 2019/0164353 A1 | 5/2019 | Yancey et al. |

OTHER PUBLICATIONS

"Invisalign Manufacturing Process English" video, uploaded to YouTube on Apr. 7, 2014, https://www.youtube.com/watch?v=vsR0_wTR2a8.

Lauren et al., "A New Computer-Assisted Method for Design and Fabrication of Occlusal Splints", American Journal of Orthodontics and Dentofacial Orthopedics, vol. 133, No. 4, Supplement 1, 2008, pp. S130-S135.

"Invisalign Manufacturing Process English" video, uploaded to YouTube on Apr. 7, 2014, https://www.youtube.com/watch?v=vsR0_wTR2a8, 125 pages of screenshots.

International Search Report and Written Opinion for International Application No. PCT/US2019/060970, dated Jan. 27, 2020, 11 pages.

International Search Report and Written Opinion for International Application No. PCT/US2020/016724, dated Apr. 14, 2020, 9 pages.

International Search Report and Written Opinion for International Application No. PCT/US2020/017660, dated Apr. 6, 2020, 9 pages.

* cited by examiner

SYSTEMS AND METHODS FOR MARKING MODELS FOR DENTAL ALIGNER FABRICATION

BACKGROUND

The present invention relates generally to fabricating dental aligners. More specifically, the present disclosure relates to marking physical models used to fabricate dental aligners.

A dental impression provides a negative imprint of the teeth and tissues in the mouth. The negative impression may be utilized to produce a physical or digital reproduction of the teeth. Generally, a dental tray having a viscous, thixotropic impression material therein is fit over the dental arches of the patient. The impression material sets to a solid leaving an imprint of the dental structures in the mouth. When removed from the mouth, the impression provides a detailed and stable negative of the teeth. Optionally, the impression is processed using digital scanning methods to create a digital negative of the teeth.

Using the negative, a dental mold can be created from which a dental aligner for realigning teeth can be fabricated. The dental aligners can be fabricated by thermoforming plastic to the positive mold. The dental aligners can be fabricated in a facility that produces aligners for many different patients. As such, a facility may produce a large number of physical models, and tracking and organizing the physical models may be difficult.

SUMMARY

One embodiment relates to a method for producing a physical model of teeth including a three-dimensional marking. The method includes receiving a first digital model of teeth in an alignment position and selecting a location for marking a physical model of the teeth in the alignment position with a three-dimensional marking, the physical model to be fabricated based on the first digital model. The method further includes generating a second digital model of the teeth in the alignment position based on the first digital model, the second digital model representing the physical model and including the three-dimensional marking at the marking location, and using a three-dimensional fabrication method to fabricate the physical model including the three-dimensional marking from the second digital model.

Another embodiment relates to a system for producing a physical model of teeth including a three-dimensional marking. The system includes a three-dimensional fabrication system configured to use a three-dimensional fabrication method to fabricate a physical model of teeth in an alignment position and a processing circuit. The processing circuit includes a processor and a memory storing instructions. When executed by the processor, the instructions cause the processing circuit to receive a digital model of the teeth in the alignment position and select a location for marking the physical model of the teeth in the alignment position with a three-dimensional marking. The instructions further cause the processing circuit to generate a second digital model of the teeth in the alignment position based on the first digital model, the second digital model representing the physical model and including the three-dimensional marking at the marking location, and control the three-dimensional fabrication system to fabricate the physical model based on the second digital model including the three-dimensional marking.

Another embodiment relates to a memory storing instructions. When executed by a processor, the instructions cause a system to receive a digital model of teeth in an alignment position and select a location for marking a physical model of the teeth in the alignment position with a three-dimensional marking, the physical model to be fabricated based on the first digital model. The instructions further cause the system to generate a second digital model of the teeth in the alignment position based on the first digital model, the second digital model representing the physical model and including the three-dimensional marking at the marking location, and provide the second digital model to a three-dimensional fabrication system, configured to use a three-dimensional fabrication method to fabricate the physical model including the three-dimensional marking.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, described herein are systems and methods for marking physical models used to create dental aligners. In various embodiments, a system receives one or more digital models representing alignment positions for a patient's teeth. In one example, a patient or a dental professional creates an impression of the patient's teeth. The impression is then scanned to create a digital model of the patient's current teeth positions (e.g., an "initial digital model"). Alternatively, or additionally, a dental professional uses a scanning system to create a digital model of the patient's current teeth positions. Once the digital model of the patient's current teeth positions is created, the digital model is used to create a digital model representing final aligned positions for the patient's teeth (e.g., a "final digital model"), and the final digital model is used to create one or more digital models representing intermediate alignment positions that the patient's teeth will be guided through using dental aligners to reach the final aligned positions (e.g., "alignment digital model(s)").

The system uses the alignment digital model(s) to fabricate one or more corresponding physical models that will be used, in turn, to fabricate dental aligners for the patient's teeth. By wearing the dental aligners (e.g., in a predetermined sequence), the patient can move his or her teeth from their initial positions in the patient's mouth to the final positions modeled in the final digital model. However, facilities fabricating the physical models often fabricate large quantities of physical models at a given time, and tracking and organizing the physical models (e.g., by customer order, lot identification, treatment sequence, process location, and/or other method of tracking or identification) may be difficult. As such, to ensure that the correct physical models are used for the right patients, each physical model may be provided with a marking identifying the physical model. For example, a marking may identify the patient associated with the physical model and where the physical model fits into the predetermined sequence of tooth positions for the patient. As another example, each fabricated physical model may be assigned a marking that may be used to identify the patient and where the physical model fits into the predetermined sequence of tooth positions using a database. The process of determining the locations of and creating these markings on physical models is described in further detail below.

Figure 1:
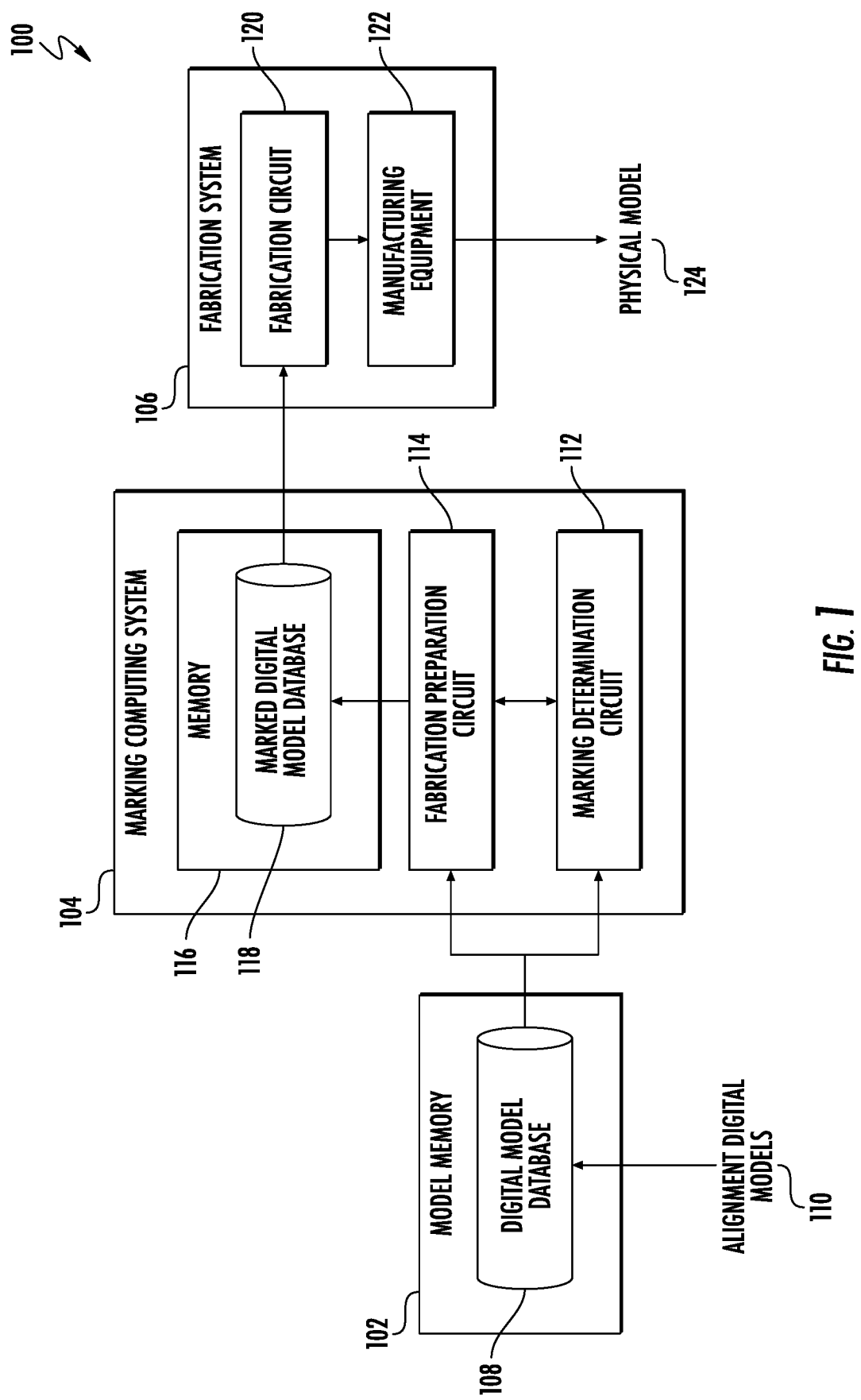
FIG. 1 is an illustration of a system for marking and fabricating physical models used to create dental aligners, according to an exemplary embodiment.

Referring now to FIG. 1, an embodiment of a marking and fabrication system for physical models 100 is shown. As illustrated in FIG. 1, the system includes a model memory 102, a marking computing system 104, and a fabrication system 106. The model memory 102, marking computing system 104, and fabrication system 106 are operatively connected. In some embodiments, at least some of the model memory 102, marking computing system 104, and fabrication system 106 may be connected via a network (e.g., the Internet, a wide-area network, a local area network, etc.). In other embodiments, alternatively or additionally, at least some of the model memory 102, marking computing system 104, and fabrication system 106 may have a wired connection. Further, in some embodiments, at least some of the model memory 102, marking computing system 104, and fabrication system 106 may be located in the same facility, whereas in other embodiments, alternatively or additionally, at least some of the model memory 102, marking computing system 104, and fabrication system 106 may be located in geographically separate facilities. As an example, the model memory 102 may be configured as a cloud storage system accessible by the marking computing system 104 via the Internet, where the marking computing system 104 is located in the same facility as the fabrication system 106. As another example, the marking computing system 104 may be located in a first facility, and the fabrication system 106 may be located in a second facility. As such, the fabrication system 106 may retrieve the marked alignment digital models from the marking computing system 104 via a network (e.g., via a file sharing program, via the Internet, etc.).

As shown in FIG. 1, the model memory 102 includes a digital model database 108. The digital model database 108 is configured to receive and retrievably store one or more alignment digital models 110. For example, the digital model database 108 may receive the one or more alignment digital models 110 from a separate computing system that created the alignment digital model(s) 110 based on an initial digital model of a patient's current teeth positions. In some embodiments, the model memory 102 may be remotely accessible (e.g., configured as a cloud storage system, configured as a remote storage system, etc.).

The marking computing system 104 includes a marking determination circuit 112 and a fabrication preparation circuit 114. As shown, the marking determination circuit 112 and the fabrication preparation circuit 114 are operatively coupled to the model memory 102. Accordingly, the marking determination circuit 112 and/or the fabrication preparation circuit 114 are configured to retrieve alignment digital models from the digital model database 108. As an example, the digital model database 108 may store the alignment digital models in a sequential order (e.g., based on when the models were received, based on a patient's last name, etc.), and the marking determination circuit 112 and/or the fabrication preparation circuit 114 may be configured to retrieve the alignment digital models in the sequential order.

The marking determination circuit 112 is also configured, for a given alignment digital model, to select a location to mark a physical model that will be fabricated based on the digital model. For example, the marking may be a raised, extruded, or embossed marking when produced with the physical model, such as machine-readable code (e.g., a three-dimensional barcode, QR code, data matrix, dot matrix, Aztec code, etc.) or human-readable code or marking (e.g., alphanumeric string, etc.). The marking may indicate a physical model number, the patient with which the physical model is associated, which teeth position the physical model is associated with (e.g., where in the sequence of teeth positions between the initial and final teeth positions the model lies), and so on. As another example, the marking may be a characteristic of the physical model. As an illustration, the marking may be the shape of a base of the physical model, such as an inherent shape of the base of the physical model (e.g., if the physical model just includes the physical model of the teeth and gingiva, an inherent shape due to the size and shape of the patient's teeth and gingiva included in the physical model) or a shape created to form the base of the physical model (e.g., a shape with a particular pattern that is associated with the physical model).

Moreover, in some embodiments, the physical model may be marked with multiple codes. For example, the physical model may be marked with a human-readable code or marking (e.g., an alphanumeric string) and a machine-readable code (e.g., a datamatrix that include a unique arch order code for the physical model). Including the human-readable code allows an individual to easily identify which physical models should be grouped together, while the unique code in the datamatrix allows for individual part traceability.

In some embodiments, the marking may be preselected for the physical model (e.g., by a computing system that generated the alignment digital model). In other embodiments, the marking determination circuit 112 may also be configured to determine a type of marking to mark on the physical model that will be fabricated based on the digital model. As an example, the marking determination circuit 112 may select the type of marking based on available space for the marking (e.g., preferring a barcode but using an alphanumeric string if there is not enough space for the barcode in a preferred marking location). In some arrangements, the marking determination circuit 112 may select the type of marking by comparing available space on different areas of the physical model, such as the base, a bottom surface of the base, and various areas of the gingiva, to stored options for types of markings (e.g., a barcode, an alphanumeric string, a QR code, a data matrix, a dot matrix, an Aztec code, etc.) and sizes of markings (e.g., a larger barcode versus a smaller, more fine or detailed but more difficult to fabricate barcode).

Additionally, according to various embodiments, the marking determination circuit 112 may be configured to select a location known to be included in the physical model that will be fabricated based on the digital model as the marking location and/or select a location to add a section or piece to the physical model as the marking location. In some embodiments, the marking determination circuit 112 may select the marking location based on available space on the physical model. For example, the marking determination circuit 112 may determine the location on the physical model that will have the most space for a marking (e.g., a section on a base between the arches of the teeth, a section on the gingiva, a bottom surface of the base, etc.). In other embodiments, the marking determination circuit 112 may use a preferred marking location unless space is not available for the marking, such as preferring a section on a base between the arches of the teeth but use a gingival location if not enough space is available for the marking. Alternatively, in other embodiments, the marking determination circuit 112 may use a default marking location only if other locations are unavailable for the marking, such as using a bottom surface of the physical model for the marking if sufficient space is unavailable for the marking on the top surface of the physical model. In still other embodiments, the marking determination circuit 112 may add a piece to the physical model to be used as the marking location, such as a piece extending from one of the back molars, that may also be used as a pickup point for robotic arms handling the physical model.

In some embodiments, the marking determination circuit 112 is configured to select the marking location such that the marking identifies just the physical model and is not included on any aligners produced from the physical model. As an example, the marking may be located in a position on the physical model that will not be included in the dental aligner(s) formed from the physical model (e.g., at a base of the physical model, on the higher gingiva of the physical model). In other embodiments, the marking determination circuit 112 is configured to select the marking location such that the marking identifies the physical model and the dental aligner(s) formed from the physical model. For example, the marking may be located in a position on the physical model that will be transferred to the dental aligner(s) formed from the physical model (e.g., on the lower gingiva of the physical model).

The fabrication preparation circuit 114 is configured to modify the alignment digital model such that the digital model is in a final form for fabrication by the fabrication system. As illustrations, the fabrication preparation circuit 114 may modify the digital model to include a base, to add a piece to the digital model to provide stability to the physical model (e.g., an arch-connecting piece), to add a piece determined by the marking determination circuit 112 to the digital model as a marking location (e.g., attached to one of the back molar portions of the physical model), and so on. Additionally, the fabrication preparation circuit 114 may also be configured to modify the alignment digital model such that the digital model is in a format compatible for fabrication by the fabrication system 106. For example, the fabrication preparation circuit 114 may convert a file type of the digital model to a file type needed for the fabrication system 106 to produce the physical model based on the digital model.

As shown in FIG. 1, the marking determination circuit 112 and the fabrication preparation circuit 114 are operably coupled to each other. As such, according to various embodiments, the marking determination circuit 112 and the fabrication preparation circuit 114 may perform their respective actions in various orders. For example, in one embodiment, the fabrication preparation circuit 114 may receive a digital model from the digital model database 108 and modify the digital model to include a base. The marking determination circuit 112 may then select a marking location on the modified digital model and a marking type for the modified digital model, which the fabrication preparation circuit 114 incorporates into the modified digital model. In another embodiment, the marking determination circuit 112 may retrieve a digital model from the digital model database 108 and select a marking location based on the digital model. The fabrication preparation circuit 114 may then generate a modified digital model including the marking (e.g., a "marked digital model"). If the marking does not fit in the selected location, the marking determination circuit 112 may then select a new location for the marking or a new type of marking, which the fabrication preparation circuit 114 incorporates into the modified digital model to produce the marked digital model.

As further illustrated in FIG. 1, the marking computing system 104 also includes a memory 116 including a marked digital model database 118. As such, once the fabrication preparation circuit 114 has produced the finalized, marked digital model configured to be transmitted to the fabrication system 106 for fabrication into a physical model, the fabrication preparation circuit 114 is configured to provide the marked digital model to the marked digital model database 118, which retrievably stores the marked digital model.

The fabrication system includes a fabrication circuit 120 and manufacturing equipment 122. As shown in FIG. 1, the fabrication circuit 120 is operatively coupled to the memory 116 of the marking computing system 104 and is configured to receive marked digital models from the marked digital model database 118. The fabrication circuit 120 is further configured to provide instructions to the manufacturing equipment 122 to produce a physical model 124 corresponding to the marked digital model, including the marking.

It should be understood that while the components of the system 100 are illustrated in the embodiment of FIG. 1 as being separate components, in some embodiments, one or more of the model memory 102, marking computing system 104, and fabrication system 106 may be combined into the same device or same system. For example, the marking computing system 104 may be implemented as part of the fabrication system 106.

Figure 2:
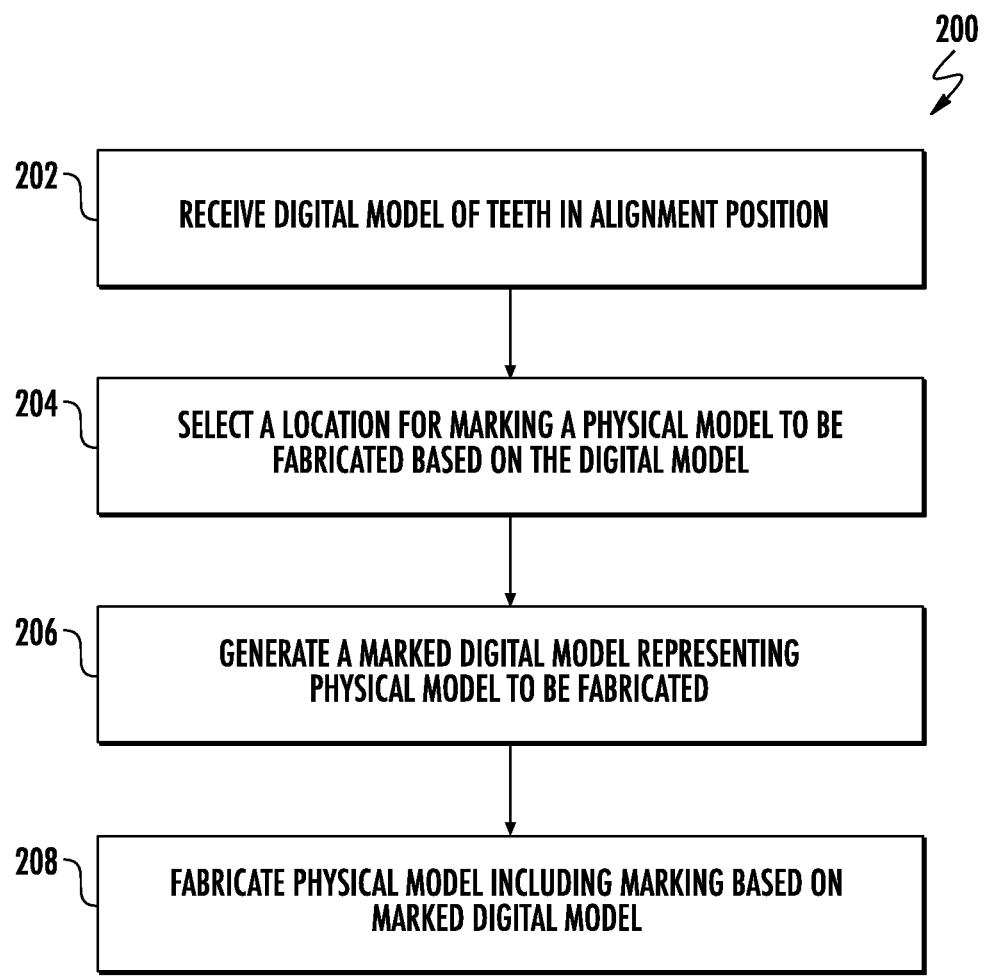
FIG. 2 is an illustration of a method of marking and fabricating physical models used to create dental aligners, according to an exemplary embodiment.

Referring now to FIG. 2, an embodiment of a method 200 of marking and fabricating physical models used to create dental aligners is illustrated. As described above, the marking is used to identify the physical model once produced. In various arrangements, the method 200 is implemented by the system 100 shown in FIG. 1, and as such, reference is made below to the components of the system 100 in describing the method 200. At operation 202, a digital model of a patient's teeth in an alignment position is received. For example, the alignment digital model is received from a separate facility or computing system that generated the alignment digital model based on (1) an initial digital model representing the patient's current teeth positions and (2) a final digital model representing modeled positions for the patient's teeth after the patient undergoes treatment with a series of dental aligners. In some arrangements, the model memory 102 receives all of the alignment digital models for a patient at one time. For example, all alignment digital models for a given patient may be generated at one time, and the model memory 102 may receive all of the alignment digital models once the digital models are generated. In other arrangements, the model memory 102 receives an alignment digital model based on when the patient needs the dental aligner(s) corresponding to the alignment digital model. As an example, the model memory 102 receives the next alignment digital model for a patient based on when the patient is scheduled to receive a next set of dental aligners.

At operation 204, a location for marking the physical model, to be fabricated from the digital model, with a three-dimensional marking is selected. The marking computing system 104 may select the location of the marking based on a variety of factors, such as the size of the arch of the model, the size of the gingiva of the digital model, the teeth included in the model, whether the physical model will or can include a base or another added piece, a default marking position, and so on. For example, in one embodiment, each physical model includes a base, and the default location for the marking is the base (e.g., a top side of the base between the arches of the teeth in the physical model or a bottom surface of the base). In another embodiment, each physical model includes just the teeth and the gingiva. As such, the marking is located on the gingiva or, if there is not enough room on the gingiva, on an additional piece of material added (e.g., attached to one of the wings of the arch, connecting the wings of the arch, etc.) onto which the marking is located. In another embodiment, each physical model is provided with an additional piece of material (e.g., attached to one of the wings of the arch, connecting the wings of the arch, etc.). The marking is provided on the piece of material, which is also used as a pickup point, for example, for robotic arms handling the physical model. Alternatively, the piece of material may be a pickup point for other automated or semi-automated material and/or model handling methods. In another embodiment, the marking is provided on a back molar of the physical model, which will be at least partially cut out of the dental aligner(s) made from the physical model and, as such, not be transferred to the final dental aligner(s). In another embodiment, if the digital model is missing one or more teeth and includes an artificial bridge for those teeth, the marking is located on the artificial bridge also included in the physical model. In another embodiment, the marking is provided at a default alternate location, such as on a bottom surface of the physical model, if no other advantageous location can be determined for the marking on the physical model (e.g., if there is not enough space on a top surface of the physical model).

In some embodiments, the location is a characteristic of the physical model rather than a particular point or area of the physical model. As an illustration, in one embodiment, the location is the size and shape of the base of the physical model (e.g., the "shadow" of the physical model). For example, a physical model may include just the teeth and the gingiva. Because each combination of teeth and gingiva is different, each physical model may have a different size and shape when viewed from the bottom surface. As such, the size and shape of the base of the digital model may be determined, or may be received at operation 202, such that the unique size and shape of the base can be used as the marking. As another example, a unique base may be added to the digital model to identify the physical model once it is fabricated (e.g., based on the side and shape of the base, based on identifying notches or geometrical cut-outs, based on geometrical shapes added to the base, etc.).

Additionally, in certain embodiments, more than one marking is used to identify the physical model. As an illustration, for a given physical model to be identified, the shadow of the physical model may be scanned to narrow down the list of physical models that the given physical model could be. Afterwards, a marking (e.g., a barcode on a top or bottom surface of the physical model) is scanned if a positive identification cannot be made based on the shadow of the physical model. As another illustration, a physical model may be marked with a human-readable code or marking, which allows an individual to easily identify the physical model and determine which physical models should be marked together, and a machine-readable code (e.g., a datamatrix with a unique arch order code), which allows for traceability of the individual physical models. Accordingly, in such embodiments, more than one marking location is determined and selected at operation 204.

Examples of markings that can be used on the physical model include a barcode, a QR code, Aztec code, a string of alphanumeric characters, a matrix (e.g., a data matrix, dot matrix), and so on. In various embodiments, the marking is configured to be multidimensional such that the marking is provided as an embossed, extruded, or imprinted section of the physical model. For example, the marking may be a three-dimensional barcode. As another example, the marking may be an embossed marking because embossed markings can more repeatably be read by scanners than, for instance, extruded markings. As discussed above, in some embodiments, selecting a location for the marking may also include determining the size and/or the type of marking that will be used on the physical model. As an illustration, a first size of barcode may be used on most physical models, but for models with arches too small to use the first barcode, a second barcode that is smaller and more fine or detailed may be used.

At operation 206, a marked digital model representing the physical model to be fabricated is generated. As an illustration, the marking computing system 104 may transform the digital model into a format (e.g., file type) that can be used with the fabrication system 106 and that includes the marking in the location determined at operation 204. Operation 206 may also include modifying the digital model for fabrication. For example, the marking computing system may remove portions of the digital model (e.g., portions of the gingiva) and/or add portions specific to the physical model (e.g., a base for the physical model, an added piece for marking and/or as a pick-up point). In some arrangements, the marking computing system 104 may modify the digital model to include a base for the physical model that is configured to fit with different fixtures plates used by different machines during the dental aligner fabrication process.

It should be understood, however, that at least some of operation 206 may occur before operation 204. For example, the marking computing system 104 may modify the digital model to include a base or to remove part of the gingiva in preparation. The marking computing system 104 may then determine where to locate the marking based on the modified digital model. Subsequently, the marking computing system 104 may produce a final marked digital model corresponding to the physical model that will be fabricated and include the marking.

At operation 208, the physical model including the marking is fabricated based on the marked digital model. In various embodiments, the physical model is fabricated using a three-dimensional ("3D") fabrication method. For the purposes of this disclosure, "3D fabrication methods" include various methods of additive manufacturing and 3D printing, including powder bed fusion (e.g., selective laser sintering), binder jetting, vat polymerization (e.g., digital light processing, continuous liquid interface production), material jetting, and material extrusion (e.g., fused deposition modeling) as described in further detail below, but exclude stereolithography ("SLA") 3D printing.

In some embodiments, a 3D fabrication method that uses a polymer powder is used to print the physical model, such as through powder bed fusion. For example, in one embodiment, the physical model is fabricated through the 3D printing process used by Hewlett Packard® Jet Fusion 3D printers. For a given cross-sectional layer of a product being printed, the Jet Fusion 3D printer applies a first agent on a sheet of polymer powder in the shape of the layer and a second agent, configured to create a smooth surface for the product, on the edge of the layer. The Jet Fusion 3D printer then uses heating lamps to evenly heat the sheet of polymer powder, causing the polymer powder areas treated with the first agent to selectively fuse together to form the layer.

In another embodiment, the physical model is fabricated using selective laser sintering ("SLS"). With SLS, a high-powered laser is directed at a sheet of polymer powder, tracing the cross-sectional shape of a given layer of a product to be printed. The polymer powder fuses where the laser is directed, thereby forming the layer. In another embodiment, the physical model is fabricated using selective laser melting ("SLM"), which is similar to SLS but causes the polymer powder to fully melt into the layer rather than being sintered into the layer. In yet another embodiment, the physical model is fabricated using selective heat sintering, where a heated print head contacts the powder and melts the powder into the next layer of the product.

In another embodiment, the physical model is fabricated using binder jetting, also known as powder bed and inkjet 3D printing and drop-on powder printing. In fabricating a product using binder jetting, a printer deposits a liquid binding agent onto a sheet of polymer powder in the form of the next cross-sectional layer of the product to be printed. The polymer powder bonds together to form the layer where the liquid agent was deposited. An example of a binder jetting printer is the VisiJet® PXL, which uses a proprietary core powder.

One advantage of using a 3D printing method with a polymer powder to fabricate the physical model is that a nylon polymer powder may be used to create a nylon physical model. Other 3D printing methods, such as SLA, use a resin instead of a polymer powder, but resin-based 3D printing methods cannot be used to create nylon products. Nylon physical models are advantageous over physical models made from other types of material for several reasons. For one, nylon physical models are balanced between toughness (e.g., brittleness) and durability (e.g., resistance to breaking), which is beneficial for creating dental aligners from the physical models. For example, in some implementations, dental aligners are fabricated by thermoforming a sheet of plastic over a physical model and trimming the thermoformed dental aligner off of the physical model. Moreover, several dental aligners may be thermoformed onto the same physical model (e.g., to create several dental aligners having the same shape but each having different flexibility depending on the thickness and/or hardness of the material used for the dental aligner). For example, three aligners may be fabricated from a given physical model, with each aligner having a different material hardness and/or thickness. In such implementations, nylon physical models are tough and durable enough to withstand multiple iterations of the thermoforming process. Furthermore, nylon may be more affordable than other materials with similar strength and lubricity.

Another advantage of using a 3D printing method with a polymer powder to fabricate the physical model is that products formed from polymer powder typically do not require supports to be printed alongside the physical model to reinforce the physical model during printing. Instead, for example, the polymer powder itself may be used to support the physical model. By contrast, 3D printing a product from a polymer resin typically requires printing supports at the same time the product is printed, for example, to reinforce overhanging layers during the fabrication process. These supports must then be removed during post-processing. Moreover, when 3D printing multiple products at the same time from a polymer powder, the products do not need to be attached to each other during the printing. As such, the products may be fabricated in volume without requiring, for example, post-processing trimming of the products from each other or from a base as is required with SLA. This may also allow for larger batches of products to be printed at one time. Furthermore, post-processing of 3D printed products from a polymer powder may be limited to a mechanical process used to remove excess powder, which may be used in a future print and thus lead to less material loss than with resins. Products fabricated using resins, however, may require a more complicated post-process. For example, products fabricated using SLA may need to be washed in an isopropyl alcohol to neutralize the resin and rinse excessive resin off of the finished parts. Further, products fabricated using SLA may need to undergo post-processing curing in ultraviolet ("UV") light. In turn, the UV light curing may require scaling calculations for the product before it is fabricated because the curing process in UV light may shrink the fabricated product.

In other embodiments, a 3D fabrication method that uses a polymer resin is used to print the physical model. In one embodiment, the physical model is fabricated using digital light processing ("DLP"). In fabricating a product using DLP, a digital projector flashes a cross-sectional image of the next layer of the product to be fabricated into a photoreactive liquid resin, which then polymerizes into the shape of the projected layer. As such, DLP is similar to SLA, which uses a laser to selectively polymerize a layer using a photoreactive liquid resin. However, with DLP entire layers of a product may be produced at one time, whereas with SLA the entire layer must be traced by the laser to be produced. As such, DLP may be used to fabricate products much more quickly than SLA.

In another embodiment, the physical model is fabricated using continuous liquid interface production ("CLIP"). Similar to DLP, CLIP uses photo polymerization to create 3D products by projecting, using UV light, a cross-sectional image of the next layer to be fabricated through an oxygen-permeable membrane forming the bottom of a container holding a liquid photopolymer resin. However, with CLIP, the oxygen-permeable membrane allows for oxygen to interact with a bottom layer of resin, which prevents the object from bonding with the bottom of the container as the oxygen inhibits the photopolymerization. The balance between the UV light and oxygen allows for continuous growth of the product from the bottom-up and therefore faster production.

Additionally, CLIP is capable of producing layers with much better resolution than DLP. An advantage of using CLIP to produce the physical model is that CLIP may be used with proprietary materials sold by Carbon®, which include resins specifically designed for producing physical models of teeth. These resins create a smooth surface finish on the physical model necessary for manufacturing dental aligners from the physical model. Moreover, another advantage of using CLIP, and other high-resolution 3D fabrication methods (e.g., Jet Fusion 3D printing), is the ability to create fine, detailed features in the physical model, such as details of the occlusal surfaces of molars (e.g., which may not be possible with SLA). Creating these fine features is beneficial because it allows for a better fit with the aligner produced from the physical model.

In another embodiment, the physical model is fabricated through material jetting. Material jetting is similar to inkjet printing but instead of printing ink, material jetting printers deposit layers of liquid photopolymer and cure them using UV light. An example of a material jetting printer is the Stratasys® PolyJet 3D printing system. In certain implementations, if a support material is needed (e.g., for overhangs or complex shapes), the material jetting printer may deposit a gel-like support material that is removed (e.g., cut off) after the product is printed. Related to material jetting is drop on demand ("DOD") 3D printing, where a pair of ink jets are used to fabricate the product. One deposits the build material, which is often a wax-like material, and the other deposits a dissolvable support material. Additionally, with DOD 3D printing, a fly-cutter is used to skim each layer to ensure a flat surface before the deposition of the next layer.

In still other embodiments, the physical model may be produced by a 3D fabrication method that does not use either a polymer powder or resin. For example, in another embodiment, the physical model is fabricated using fused deposition modeling ("FDM"), where a plastic filament (e.g., held on a reel) is fed through a heated nozzle. The printer extrudes the melted plastic filament along a path to create a cross-sectional layer of the product being printed. Once the extruded material cools down, the cooled material serves as the foundation for the next layer of the product being printed. Using FDM may be advantageous because FDM is low-cost and does not require supports for products being manufactured.

Furthermore, in some other embodiments, the physical model may be produced by a different additive manufacturing process (e.g., a process that creates a product by depositing material) and/or subtractive manufacturing process (e.g., a process that creates a product by removing material). For example, in some arrangements, the physical model may be produced by laminated object manufacturing, where a product is produced by depositing layers of a material, such as a polymer, that are coated with a binder. Afterwards, the material is cut into a desired shape, such as with a blade or a laser.

Figure 3:
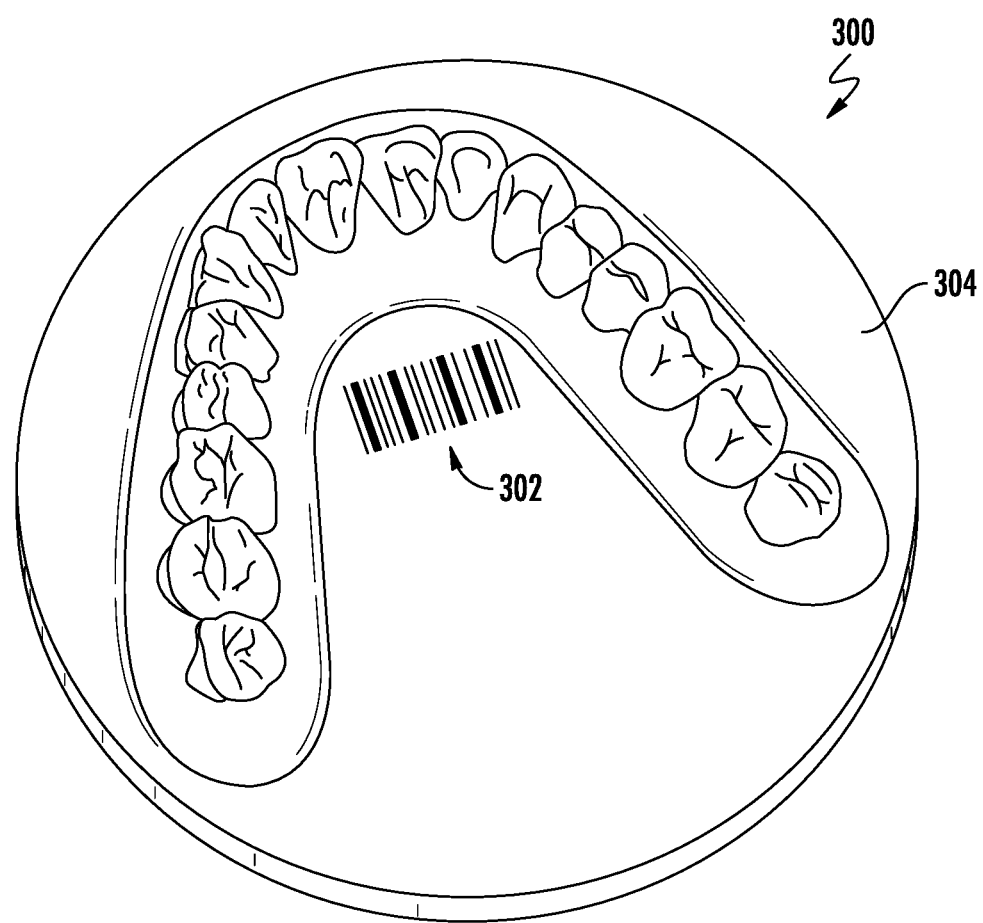
FIG. 3 is an illustration of a physical model including a barcode marking, according to an exemplary embodiment.
Figure 4:
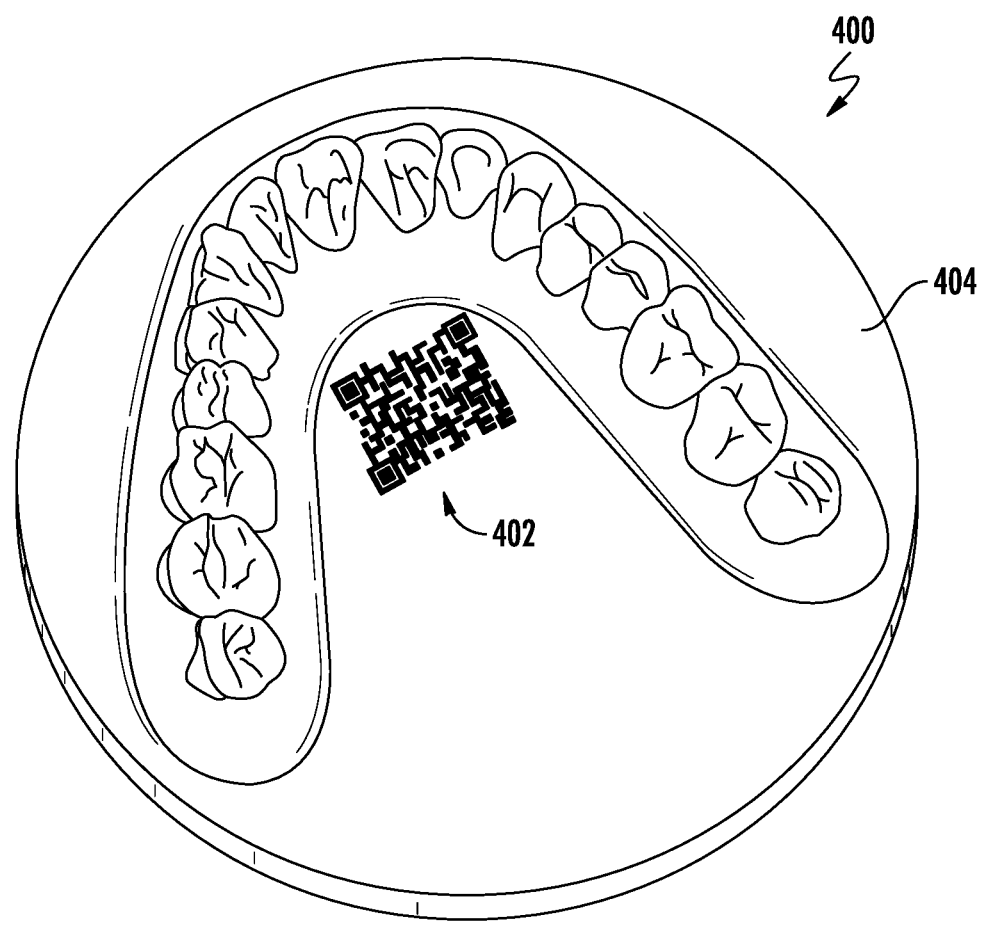
FIG. 4 is an illustration of a physical model including a Quick Response Code ("QR code") marking, according to an exemplary embodiment.
Figure 5:
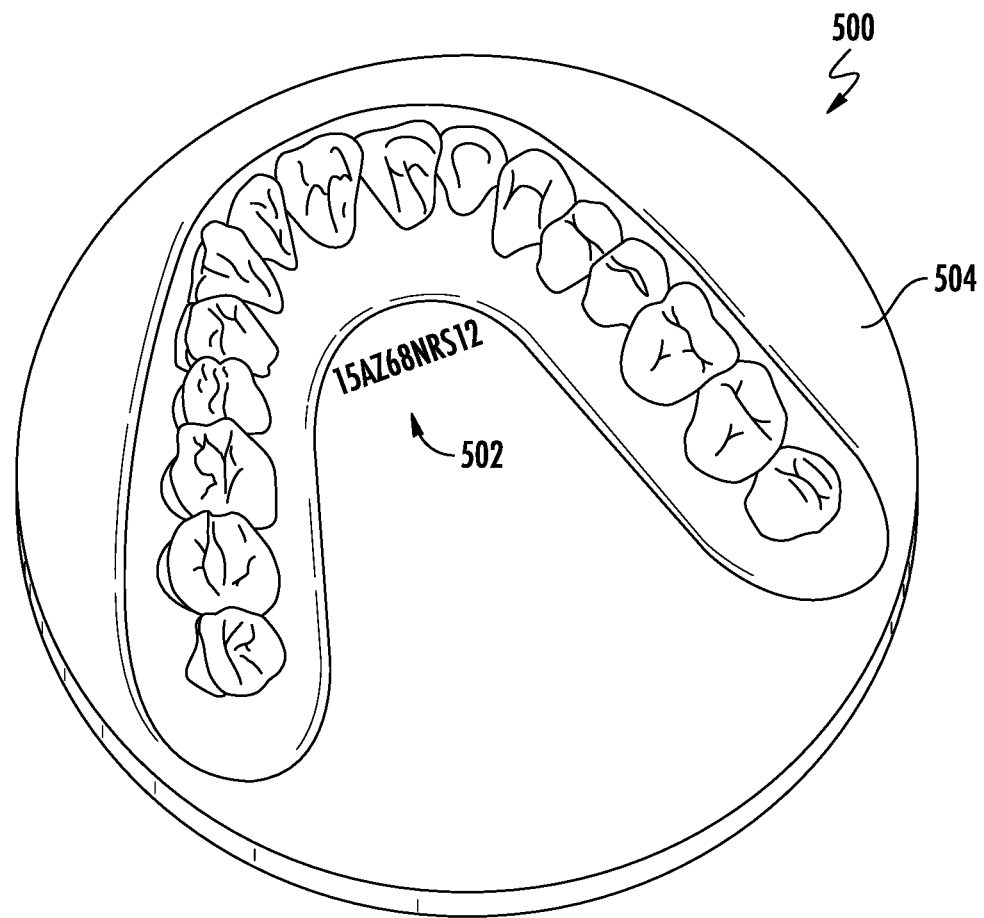
FIG. 5 is an illustration of a physical model including an alphanumeric marking, according to an exemplary embodiment.

As discussed above, the physical model may be marked with different types of markings according to various embodiments. FIGS. 3-5 illustrate several types of markings, according to exemplary embodiments. FIG. 3 illustrates a physical model 300 with a barcode marking 302 on a base 304 of the physical model 300. FIG. 4 illustrates a physical model 400 with a QR code marking 402 on a base 404 of the physical model 400. FIG. 5 illustrates a physical model 500 with an alphanumeric marking 502 on a base 504 of the physical model 500. In various arrangements, the marking 302, 402, and/or 502 may be an imprinted or raised (e.g., embossed or extruded), three-dimensional marking readable by a multidimensional barcode reader, QR reader, scanner, etc. It should also be understood that FIGS. 3-5 illustrate examples of physical model markings and that, in other embodiments, other markings may be used. For example, in other embodiments, a different machine-readable code (e.g., a data matrix, a dot matrix, an Aztec code, etc.) or a different human-readable code or marking may be used.

As further discussed above, the physical model may also be marked in different locations according to various embodiments. FIG. 3 (as well as FIGS. 4 and 5) illustrates marking the physical model 300 on the base 304 of the physical model 300 that is fabricated along with the teeth in the alignment position. However, in some embodiments, the physical model may not include a base or the top surface of the base may be too small for marking (e.g., because the patient's arch is small or narrow). As such, FIGS. 6-9 further illustrate additional locations for physical model marking, according to exemplary embodiments.

Figure 6:
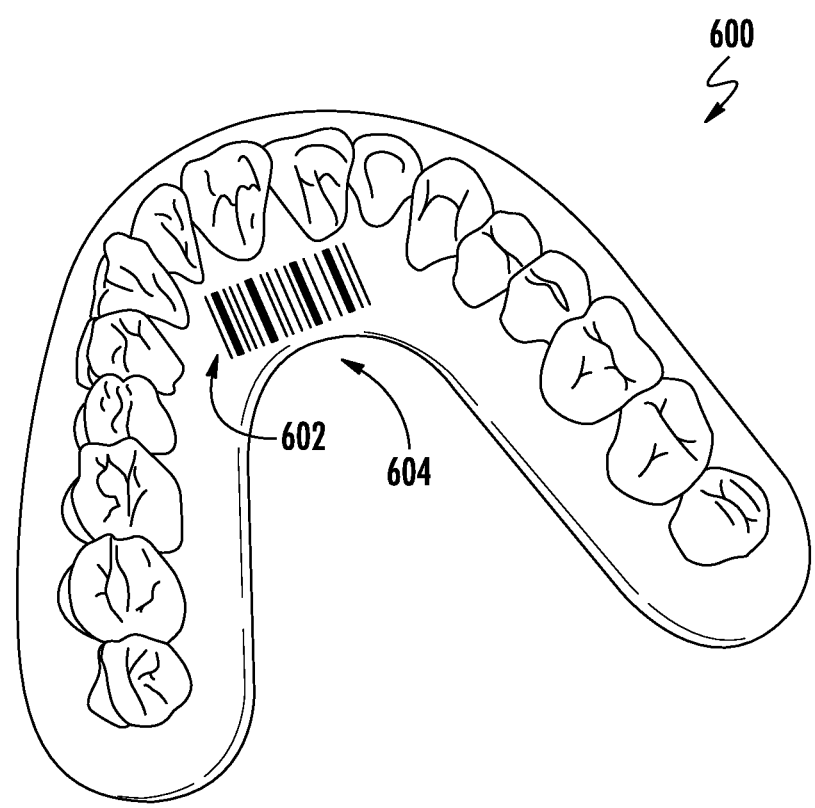
FIG. 6 is an illustration of a physical model including a marking in a gingiva location, according to an exemplary embodiment.

Referring first to FIG. 6, a physical model 600 is illustrated with a marking 602 (e.g., a barcode marking as shown in FIG. 6 or another marking) at a gingival location 604 of the physical model 600. In some arrangements, the physical model 600 is marked at a gingival location 604 that is high enough on the gingiva of the physical model 600 that the marking 602 is not transferred onto any dental aligners fabricated using the physical model 600 (e.g., because a thermoformed dental aligner is fabricated with a trim line that is below the marking 602). Alternatively, in other arrangements, the physical model 600 is marked at a gingival location 604 that will be transferred onto a dental aligner fabricated using the physical model 600 (e.g., due to the embossing of the marking 602, the marking 602 is transferred to the dental aligner during the thermoforming process of the dental aligner).

Figure 7:
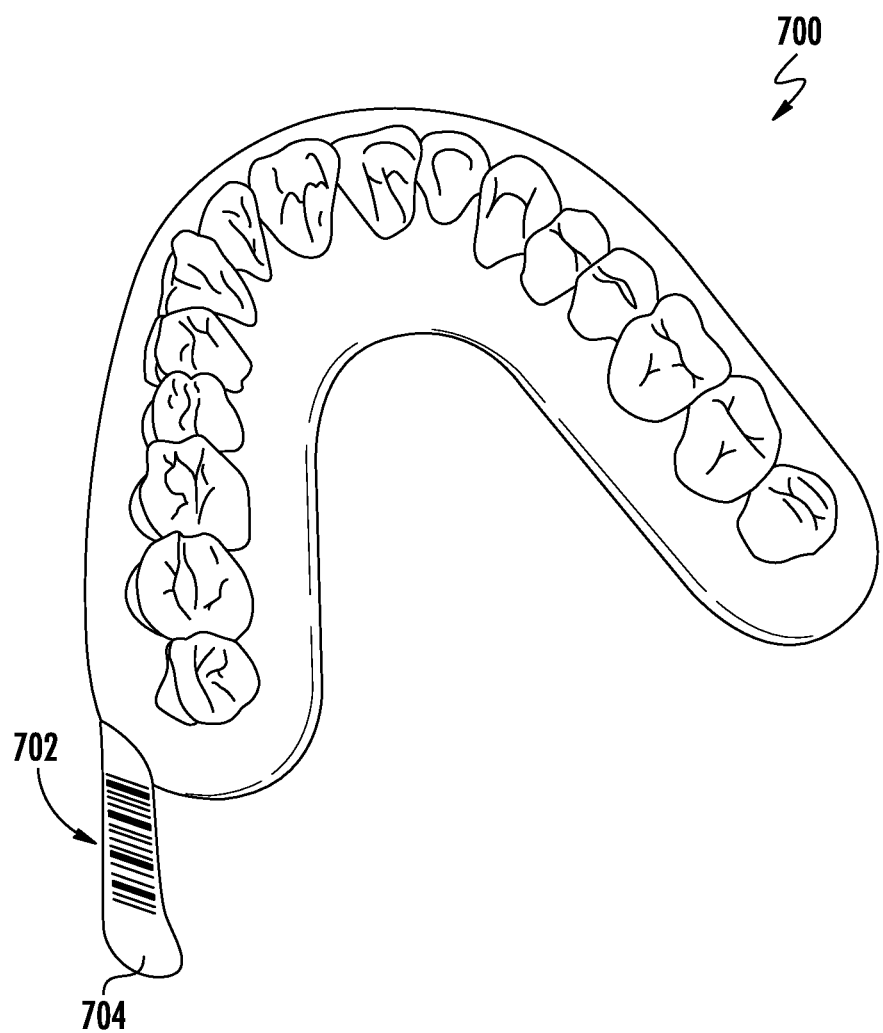
FIG. 7 is an illustration of a physical model including a marking in an added piece, according to an exemplary embodiment.

Referring next to FIG. 7, a physical model 700 is illustrated with a marking 702 (e.g., a barcode marking as shown in FIG. 7 or another marking) at a piece 704 that is added to one of the wings of the arch of the physical model 700 for marking. In some arrangements, the piece 704 is added to the physical model 700 if the physical model 700 does not include another suitable location for marking. For example, the piece 704 may be added because the arch of the physical model 700 is too small or narrow to allow for marking on a base of the physical model 700 and/or the gingival area is not large enough to allow for marking without being transferred to a dental aligner fabricated using the physical model 700. In other arrangements, the piece 704 is added to all physical models 700, and, for example, is also used as a pickup point for a robotic system handling the physical model 700.

Figure 8:
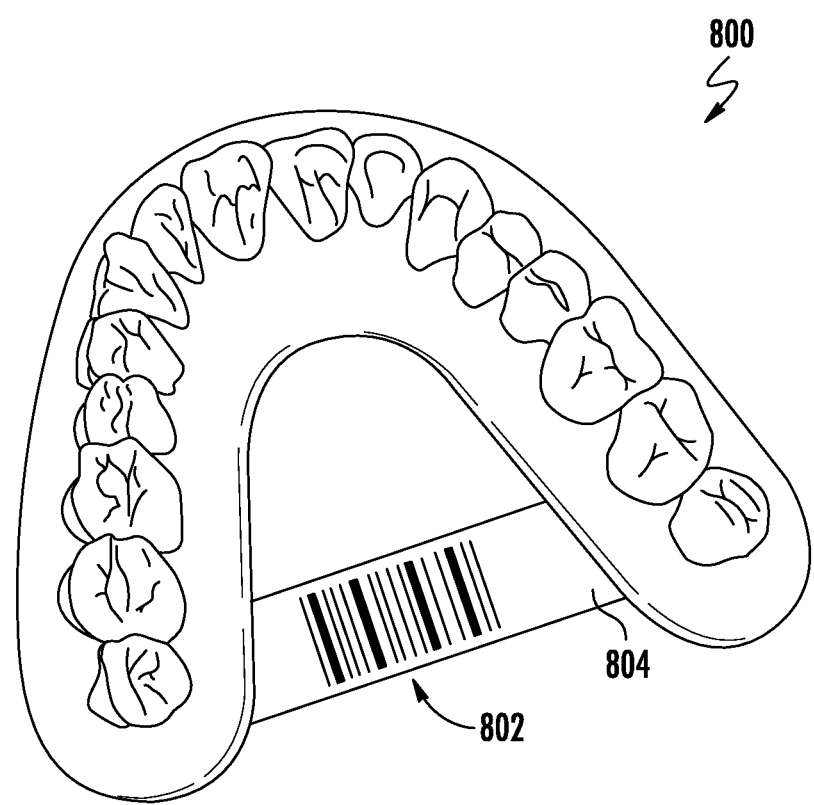
FIG. 8 is an illustration of a physical model including a marking in an added arch-connecting piece, according to an exemplary embodiment.

Referring next to FIG. 8, as physical model 800 is illustrated with a marking 802 (e.g., a barcode marking as shown in FIG. 8 or another marking) at a cross-arch piece 804 that is added to connect the wings of the arch of the physical model 800. In some arrangements, similar to the piece 704, the piece 804 is added to the physical model 800 if the physical model 800 does not include another suitable location for marking. In other arrangements, the piece 804 is added to all physical models 800. For example, the piece 804 may be added to provide mechanical stability to the physical model 800 and/or may be added to be used as a pickup point for a robotic system handling the physical model 800.

Figure 9:
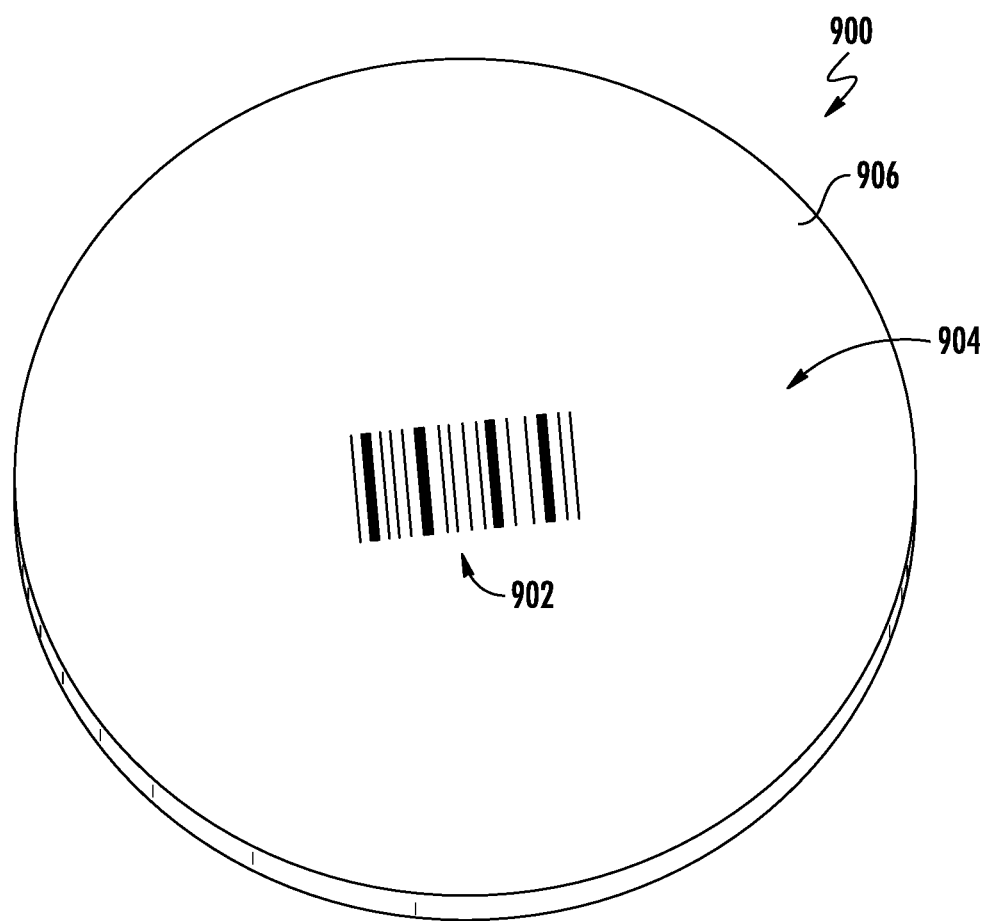
FIG. 9 is an illustration of a physical model including a marking on a bottom surface of a base of the physical model, according to an exemplary embodiment.
Figure 10:
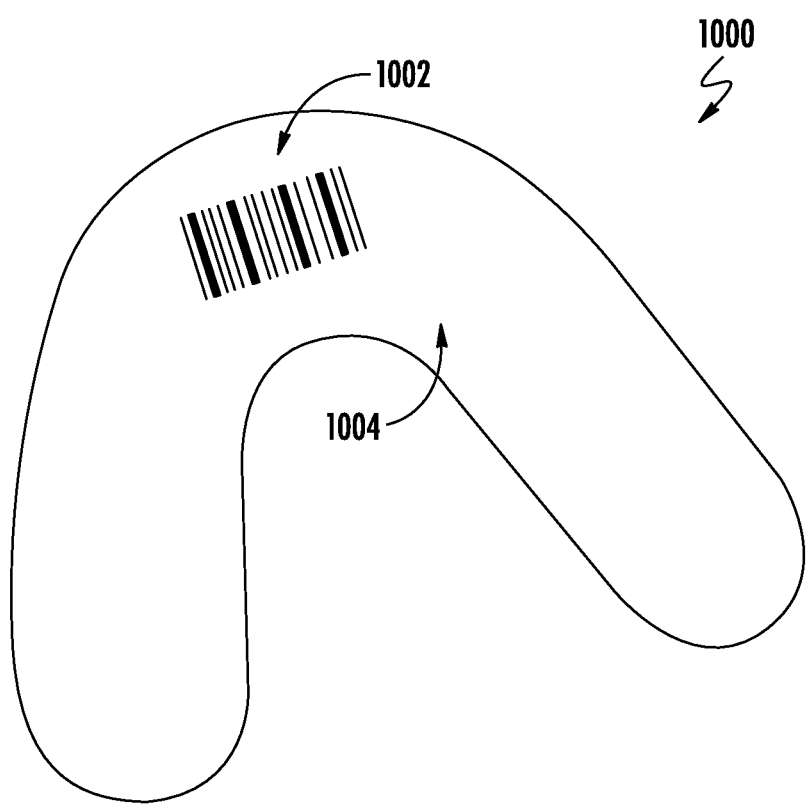
FIG. 10 is an illustration of a physical model including a marking on a bottom surface of the physical model, according to an exemplary embodiment.

Referring next to FIG. 9, a physical model 900 is illustrated with a marking 902 (e.g., a barcode marking as shown in FIG. 9 or another marking) on a bottom surface 904 of a base 906 supporting the teeth in the physical model 900. In some arrangements, the bottom surface 904 of the base 906 is a default location for marking the physical model 900. In other arrangements, the bottom surface 904 of the base 906 is used for marking the physical model 900 if the top surface of the base 906 does not include enough space for the marking 902 (e.g., because the patient's arch supported on the top surface is small or narrow). Alternatively, referring next to FIG. 10, a physical model 1000 is illustrated with a marking 1002 (e.g., a barcode marking as shown in FIG. 10 or another marking) on a bottom surface 1004 of the physical model 1000. As shown in FIG. 10, the physical model 1000 does not include an additional base as in the physical model 900 shown in FIG. 9. Instead, the physical model 1000 includes just the teeth and the gingiva such that the bottom surface 1004 is outlined by the gingiva included in the physical model 1000.

It should also be understood that FIGS. 3-10 illustrate examples of locations for physical model markings and that, in other embodiments, other marking locations may be used. Further, in other embodiments, more than one marking location and/or more than one marking may be used for a single physical model, such as a human-readable code or marking and a datamatrix marked on the bottom surface of the base of the physical model.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the Figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps. It is important to note that the construction and arrangement of the systems and methods of the inventive concepts as shown in the various exemplary embodiments is illustrative only. Additionally, any element disclosed in one embodiment may be incorporated or utilized with any other embodiment disclosed herein. It should be appreciated that other elements of the various embodiments may be incorporated or utilized with any of the other embodiments disclosed herein.

What is claimed is:

1. A method comprising:
receiving a first digital model of teeth in an alignment position;
selecting a marking location for marking a positive physical model of the teeth in the alignment position with a three-dimensional marking, the positive physical model to be fabricated based on the first digital model, wherein selecting the marking location for marking the positive physical model comprises determining whether a top surface of a base of the positive physical model will be large enough for the three-dimensional marking;
generating a second digital model of the teeth in the alignment position based on the first digital model, the second digital model representing the positive physical model and including the three-dimensional marking at the marking location;
fabricating, using a powder-based three-dimensional fabrication method, the positive physical model including the three-dimensional marking from the second digital model; and
manufacturing, from the fabricated positive physical model including the three-dimensional marking, a plurality of dental aligners for the same patient by forming a material against the fabricated positive physical model without forming the material against the three-dimensional marking such that the plurality of dental aligners are not marked with the three-dimensional marking.

2. The method of claim 1, wherein selecting the marking location for marking the physical model further comprises, in response to determining that the top surface of the base of the physical model will be large enough for the three-dimensional marking, selecting the top surface of the base as the marking location.

3. The method of claim 1, wherein selecting the marking location for marking the physical model further comprises, in response to determining that the top surface of the base of the physical model is not large enough for the three-dimensional marking, selecting one of a gingival location, a piece added to the physical model, or a bottom surface of the base as the marking location.

4. The method of claim 1, wherein selecting the marking location for marking the physical model of the teeth further comprises:
determining a location to add a piece to the physical model; and
selecting the piece as the marking location.

5. The method of claim 1, wherein a type of the three-dimensional marking is one of an embossed barcode, an embossed QR code, an embossed Aztec code, embossed alphanumeric characters, or an embossed matrix.

6. The method of claim 1, wherein the three-dimensional fabrication method is a three-dimensional printing method using a polymer powder.

7. The method of claim 1, wherein the three-dimensional fabrication method is one of selective laser sintering, selective laser melting, binder jetting, or material jetting.

8. The method of claim 5, further comprising selecting the type of the three-dimensional marking based on a size of the top surface of the base.

9. The method of claim 1, wherein the three-dimensional marking comprises multiple codes that are indicative of the same information.

10. The method of claim 9, wherein the multiple codes comprise a human-readable code and a machine-readable code.

11. The method of claim 1, wherein selecting the marking location for marking the positive physical model is based on a size of the arch of the first digital model.

12. The method of claim 1, wherein selecting the marking location for marking the positive physical model is based on a size of the gingiva of the first digital model.

13. The method of claim 1, wherein selecting the marking location for marking the positive physical model is based on a size of a tooth of the first digital model.

14. The method of claim 1, wherein selecting the marking location for marking the positive physical model further comprises determining whether a gingival surface of the positive physical model will be large enough for the three-dimensional marking.

15. The method of claim 1, further comprising adding a piece to the positive physical model large enough for the three-dimensional marking.

16. The method of claim 15, wherein the piece added to the positive physical model is coupled to a wing of the positive physical model.

17. The method of claim 15, wherein the piece added to the positive physical model is coupled to each wing of the positive physical model.

18. The method of claim 1, wherein the positive physical model comprises a default marking position.

19. The method of claim 18, wherein selecting the marking location for marking the positive physical model further comprises determining whether the default marking position of the positive physical model will be large enough for the three-dimensional marking.

20. The method of claim 1, wherein selecting the marking location for marking the physical model comprises selecting a bottom surface of the base as the marking location.

\* \* \* \* \*